United States Patent [19]

Blach

[11] Patent Number: 5,836,682

[45] Date of Patent: Nov. 17, 1998

[54] APPARATUS FOR CONTINUOUS PROCESSING OF FLOWABLE MATERIALS

[76] Inventor: Josef Blach, Gartenstrasse 8, D-71732 Tamm, Germany

[21] Appl. No.: 789,291

[22] Filed: Jan. 28, 1997

[30] Foreign Application Priority Data

Feb. 6, 1996 [DE] Germany ..................... 196 04 228.3
Jun. 5, 1996 [DE] Germany ..................... 196 22 582.5

[51] Int. Cl.⁶ ..................................................... B29B 7/48
[52] U.S. Cl. ............................. 366/84; 366/297; 425/204
[58] Field of Search .................................. 366/83, 84, 85, 366/86, 297, 301, 100; 425/204

[56] References Cited

U.S. PATENT DOCUMENTS

| | | | |
|---|---|---|---|
| 1,356,296 | 10/1920 | LaCasse et al. | 366/85 |
| 2,550,226 | 4/1951 | Colombo | 366/85 |
| 2,563,396 | 8/1951 | Colombo | 366/85 |
| 2,581,451 | 1/1952 | Sennet | 366/85 |
| 2,942,294 | 6/1960 | Reifenhauser | 425/204 |
| 3,525,124 | 8/1970 | Ocker | 425/204 |
| 3,640,669 | 2/1972 | Hanslik | 425/204 |
| 3,929,322 | 12/1975 | Hanslik | 366/85 |
| 4,591,487 | 5/1986 | Fritsch | 366/83 |
| 4,686,088 | 8/1987 | Fritsch | 366/85 |
| 5,393,140 | 2/1995 | Blach . | |
| 5,429,435 | 7/1995 | Blach | 366/85 |
| 5,476,319 | 12/1995 | Blach | 366/83 |
| 5,510,073 | 4/1996 | Kaegi et al. | 366/83 |

FOREIGN PATENT DOCUMENTS

| | | |
|---|---|---|
| 635 343 A1 | 1/1995 | European Pat. Off. ............... 366/84 |
| 1 596 363 | 6/1970 | France ................................... 366/85 |
| 2 303 366 | 7/1974 | Germany . |
| 2905717 | 8/1980 | Germany . |
| 2900988C2 | 7/1982 | Germany . |
| 2726962C2 | 9/1982 | Germany . |

*Primary Examiner*—Tony G. Soohoo
*Attorney, Agent, or Firm*—Flynn, Thiel, Boutell & Tanis, P.C.

[57] ABSTRACT

The invention is directed to an apparatus for continuous processing of pourable and flowable materials having a plurality of axis-parallel, rotatable shafts disposed at the same central angle distance along a circle in a space in a housing. Each shaft carries a number of processing elements disposed axially one behind the other with which adjacent shafts closely mesh. The housing is provided on the radially inside and outside sides of the space with axis-parallel concave segments of a circle which receive and guide the particular shaft with its processing elements. At least one material supply opening is provided at one end of the housing and at least one material discharge opening is provided at the other end of the house. At least one radial opening is provided along the circle for passage of the material from the radially outside to the radially inside sides of the space.

24 Claims, 10 Drawing Sheets

APPARATUS FOR CONTINUOUS PROCESSING OF FLOWABLE MATERIALS

FIELD OF THE INVENTION

This invention relates to an apparatus for continuous processing of pourable or flowable materials. More specifically, the invention relates to an apparatus having a plurality of axis-parallel, rotatable shafts disposed at the same central angle distance along a circle in a space in a housing, each carrying a number of processing elements disposed axially one behind the other with which adjacent shafts closely mesh, the housing being provided on the radially inside and outside sides of the space with axis-parallel concave segments of a circle which receive and guide the particular shaft with its processing elements, and at least one material supply opening into the space is provided at one end of the housing at least one material discharge opening out of the space and at the other end of the housing.

BACKGROUND OF THE INVENTION

Such an apparatus is known (U.S. Pat. No. 1,356,296). The processing elements are formed by screws and the material is supplied via a supply opening in the housing. The shafts carrying the screws form a ring. Due to the great number of shafts such an apparatus has a much greater volume throughput than e.g. a twin screw. If the screws are executed as a close-meshing stripping profile such an apparatus guarantees a narrow sojourn-time spectrum and achieves a high self-cleaning effect. However, the closely meshing screws prevent material from passing through the ring, at least in the case of solid or highly viscous materials. When such materials are fed to the known apparatus, only the outer area of the annular space is therefore filled while the inner area of the annular space is empty or at least has a much lower filling ratio. This causes the shafts to bend inward, the consequence being that the screws are urged against the core and are thus subject to high wear. Furthermore, narrow uncontrolled gaps result between the individual processing elements so that local overloading or even mutual striking can occur.

SUMMARY OF THE INVENTION

The problem addressed by the invention is to form an apparatus for continuous processing of pourable and flowable materials in such a way that it can also be used to process solid or highly viscous materials. More specifically, the invention relates to an apparatus having a plurality of axis-parallel, rotatable shafts disposed at the same central angle distance along a circle in a space in a housing, each carrying a number of processing elements disposed axially one behind the other with which adjacent shafts closely mesh, the housing being provided on the radially inside and outside sides of the space with axis-parallel concave segments of a circle which receive and guide the particular shaft with its processing elements, and at least one material supply opening into the space is provided at one end of the housing at least one material discharge opening out of the space and at the other end of the housing.

This is obtained according to the invention by an apparatus having at least one radial opening positioned in the circle defined by axes of shafts for passing material from the radial inner side to the radial outer side of the opening in the housing. The subclaims render advantageous embodiments of the inventive apparatus.

In the inventive apparatus several, i.e. at least three, axis-parallel, rotatable shafts are disposed in a housing in a space with a circular arc cross section, each carrying a number of positive-feed processing elements disposed axially one behind the other with which adjacent shafts mesh closely. The central angle distance between at least two of said shafts is greater than the central angle distance between the meshing shafts. The circular arc space has an arc length corresponding to the arc length of the circular arc formed by the shafts carrying the processing elements. The circular arc space is closed at both ends by concave segments of a circle which receive the two shafts with their processing elements which are disposed at the greater central angle distance apart.

On one side of the housing, preferably the one where the greater central angle distance is present, the material supply opening is provided to the circular arc space in which the shafts carrying the processing elements are disposed.

The quantity of material and thus the pressure are therefore distributed uniformly in the circular arc space with the shafts carrying the processing elements even when the material is supplied through the material supply opening without pressure. This largely prevents a radial load leading to sagging of the shafts. Accordingly the shafts provided in the inventive apparatus can be given a long design and a correspondingly great number of processing elements.

The invention thus provides an apparatus of relatively simple construction for continuously processing, for example mixing, melting, homogenizing, kneading or gassing or degassing, powdery or granulated materials as well as viscous materials, in particular viscous reactive materials.

The more shafts are provided in the circular arc space the greater the volume throughput is. At the same time the self-cleaning effect is higher the more shafts are present, since this accordingly increases the proportion of shafts cleaned by two adjacent shafts compared to the shafts at the end of the arc which are only cleaned by one adjacent shaft. For the same reason the pressure buildup ability is also greater and the sojourn-time spectrum is narrower, the greater the number of shafts in the circular arc space. A narrow sojourn-time spectrum is of essential importance in particular in the case of reactive process control.

At the same time, the inventive apparatus permits the throughput to be varied over a wide range by a different number of shafts at comparable speed and screw lead.

In the following several embodiments of the inventive apparatus will be explained more closely with reference to the drawing, in which.

According to FIGS. 1 to 5 the apparatus has space 2 extending along circle 3 in housing 1. Space 2 contains a plurality of axis-parallel shafts 4, 4', 4". Space 2 extends between the inside of housing wall 5 and axial inner core 6.

Housing 1 is closed on the end faces with end plates 7, 8. Shafts 4, 4', 4" extending through plate 7 are driven in the same direction by a gear not shown in FIG. 1.

Disposed on each shaft 4, 4', 4" so as to rotate therewith are a plurality of positive-feed processing elements 9 formed as screw elements. As indicated for example by FIGS. 2 and 4, screw elements 9 of adjacent shafts 4, 4', 4" mesh with little play, i.e. largely closely.

Figure 1:
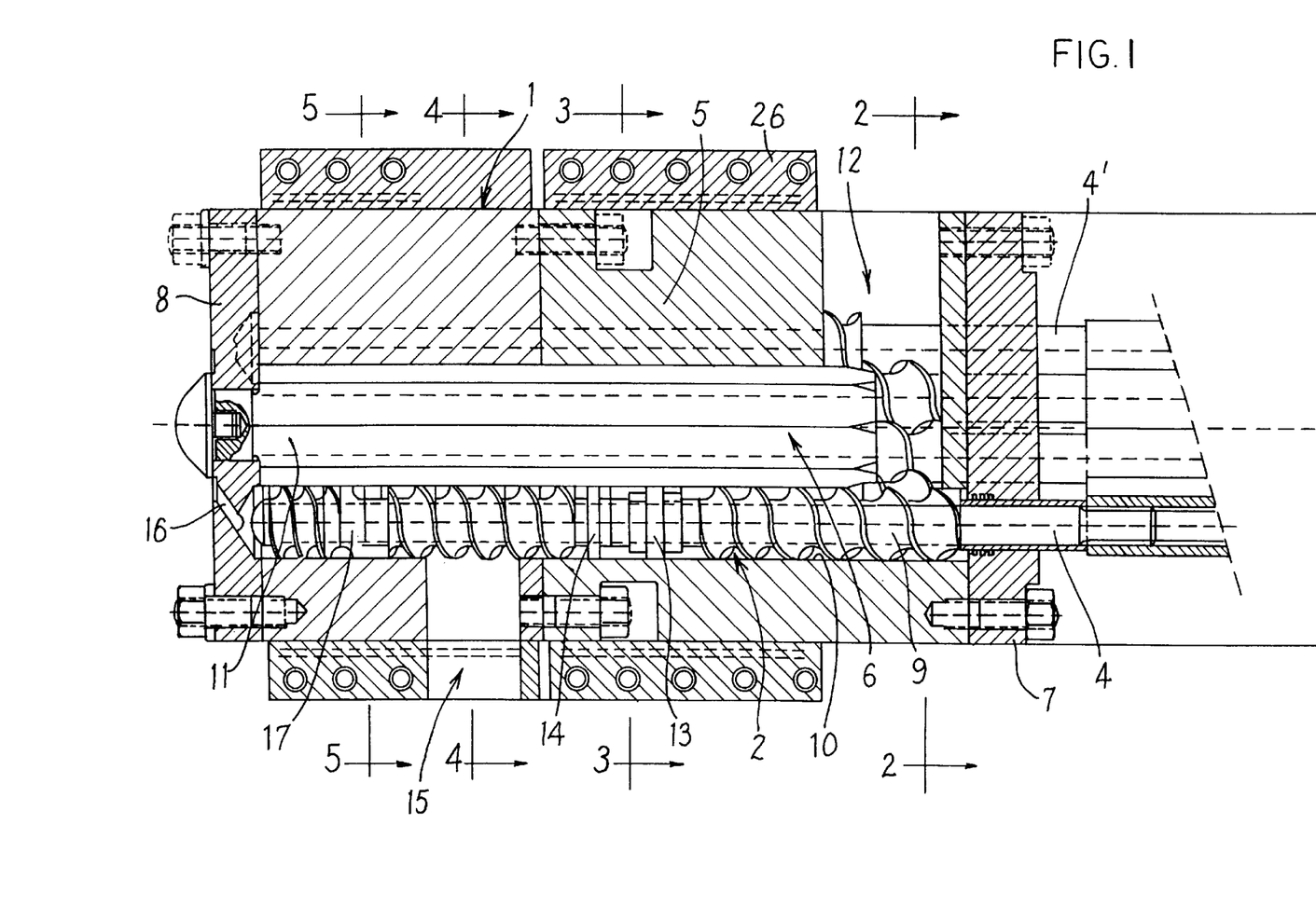
FIG. 1 shows a longitudinal section through a first embodiment of the apparatus along line I—I in FIGS. 2 to 5.
Figure 2:
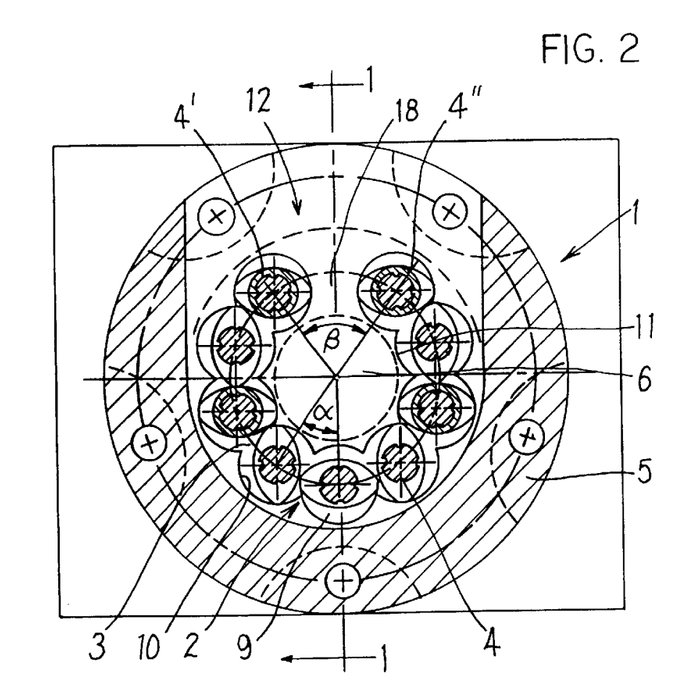
FIGS. 2 to 5 show sections along lines II—II, III—III, IV—IV and V—V in FIG. 1, respectively.
Figure 3:
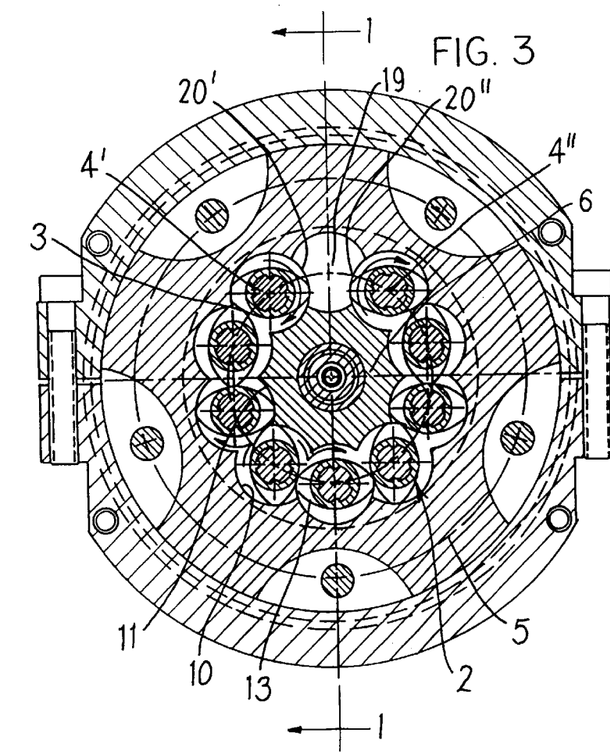
Figure 4:
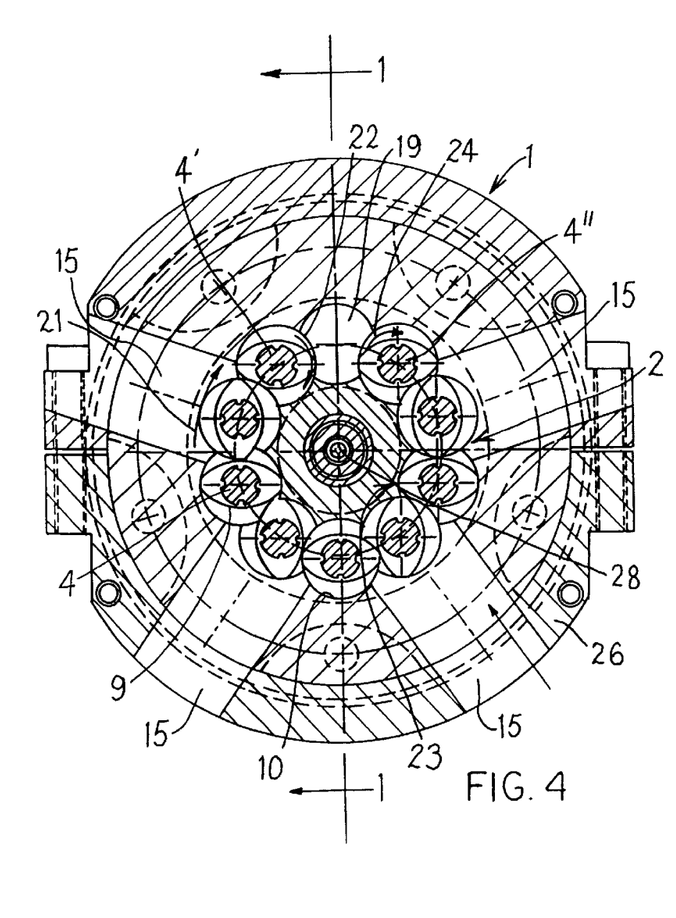
Figure 5:
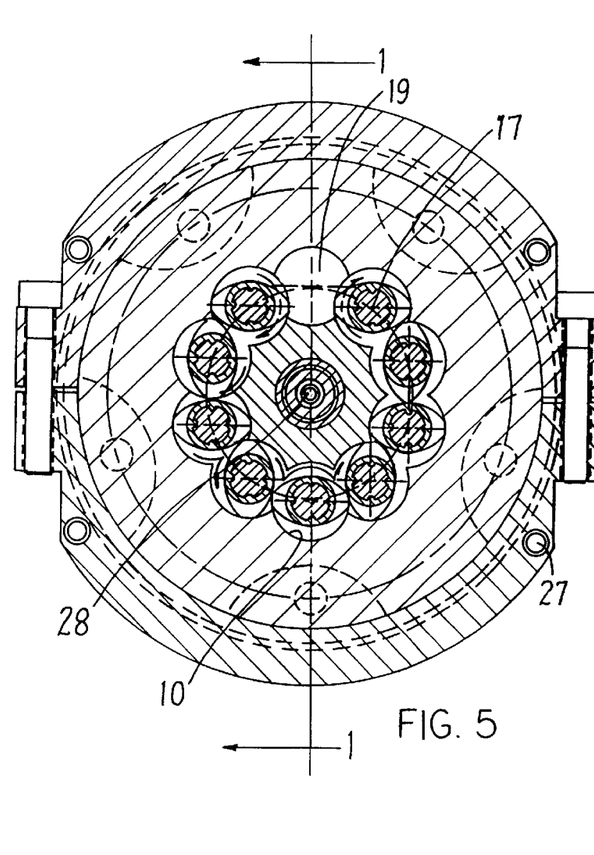

Housing wall 5 is provided on the inside and core 6 on the outside with axis-parallel, concave segments 10 and 11, respectively. In cross section the inside of housing wall 5 and core 6 thus have a rosette shape comprising concentric segments 10 and 11 of a circle whose center is located in the cylinder surface of circle 3. Processing elements 9 mesh with segments 10 and 11 in housing wall 5 and core 6 with little play, i.e. largely closely.

At one end facing end plate 7 housing 1 has opening 12 on the upper side through which the material to be processed (not shown) is supplied to space 2 with a circular arc cross section. The lateral surfaces of opening 12 extend tangentially to circular arc space 2 so that opening 12 forms with space 2 a space of U-shaped cross section, as evident from FIG. 2.

Screw elements 9 on shafts 4, 4', 4" extend from material supply opening 12 into closed, circular arc space 2 on the material discharge side to mixing blocks 13 which consist of three or more cam disks mutually offset at an angle in the peripheral direction whose contour is formed by several arcs in each case. Such mixing blocks are known for example from DE-B-813 154 and EP 0 422 272 A1. To permit a maximum quantity of material to be pressed through the gaps between mixing blocks 13 of adjacent shafts 4, mixing blocks 13 on shafts 4 are followed on the material discharge side by accumulating processing elements on each shaft 4, for example baffle plates 14.

If the material to be processed is a solid thermoplastic material, for example plastic granules, plasticization can take place in the area of mixing blocks 13.

To permit volatile constituents to be removed, gas outlet openings 15 are provided in housing 1 on the material discharge side of mixing blocks 13 or baffle plates 14. In the area of housing openings 15 shafts 4 thus again have positive-feed processing elements 9, for example screw elements, with which adjacent shafts 4 mesh with little play. Similarly, concave segments 10 and 11 extend over the total length of circular arc space 2 on the inside of housing wall 5 and on core 6.

The gases emerging from the plasticized material flow through the thin gaps between screws 9 of adjacent shafts 4 into the outer area of circular arc space 2 from where they pass to the outside through openings 15.

The material is discharged via channels 16 which extend to the outside from circular arc space 2 from each shaft 4 through end plate 8. A spray head (not shown) into which channels 16 open can be fastened for example to said end plate.

For compacting the plasticized material before it enters channels 16, accumulating processing elements, for example short screw elements 17 with opposite pitch, are provided on the material discharge side of degassing openings 15.

According to FIG. 2, opening 18 is provided between the two uppermost shafts 4' and 4" at the mouth of material supply opening 12. A shaft is thus left out in area 18, so to speak. Filling piece 19 having a diameter corresponding to processing elements 9, 14 and 17 is accordingly provided instead of a shaft in space 2 from material supply opening 12 to the end of the apparatus on the material discharge side, i.e. to end plate 8. Circular arc space 2 is closed at both ends by concave segments 20', 20" in filling piece 19 which receive the two shafts 4', 4" with their processing elements 9, 14, 17 engaging largely closely in segments 20, 20".

That is to say, to form opening 18 filling piece 19 is left out there and central angle distance β between the two shafts 4' and 4" greater than central angle distance α between meshing shafts 4, 4', 4". In this embodiment central angle distance β is twice as great as central angle distance α.

According to FIG. 4 the material to be processed is transported according to arrow 21 on the outside of space 2 along shafts 4, then between shaft 4' and filling piece 19 according to arrow 22 to the inside of space 2 and then according to arrow 23 to shaft 4" and finally according to arrow 24 between shaft 4" and filling piece 19 back to the outside of space 2.

Housing 1 is adapted to be cooled and heated. For this purpose housing 1 is surrounded with jacket 26 in which spiral 27 extends to carry a cooling or heating liquid. Further, axial channel 28 through which the cooling or heating liquid flows extends through core 6.

Figure 6:
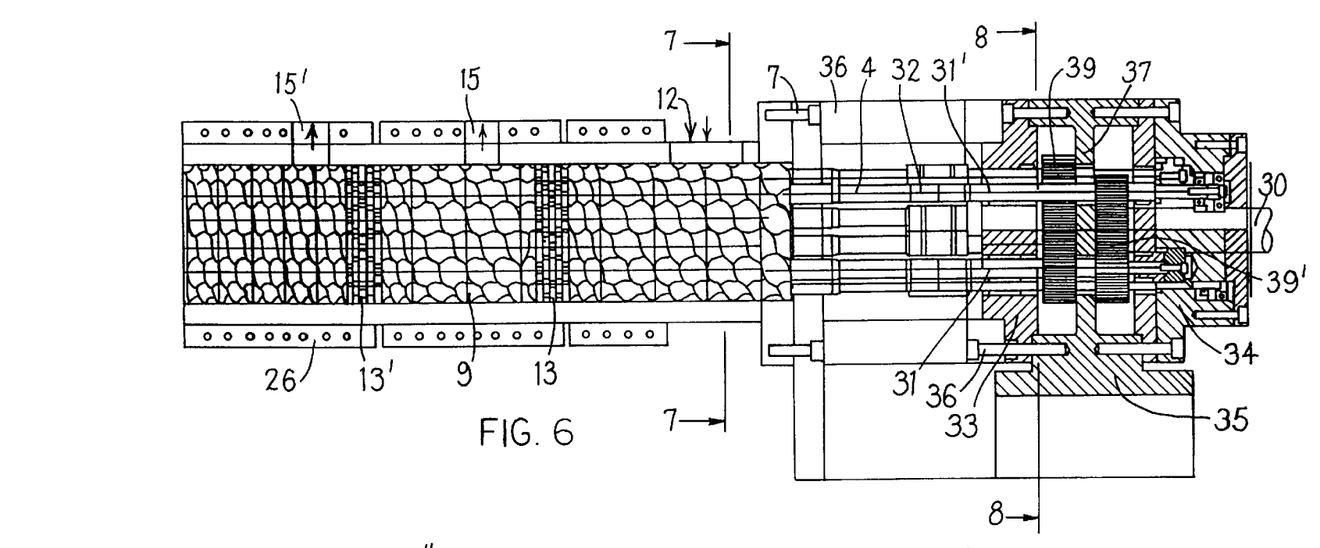
FIG. 6 shows a longitudinal section through a second embodiment of the apparatus with a drive part.
Figure 7:
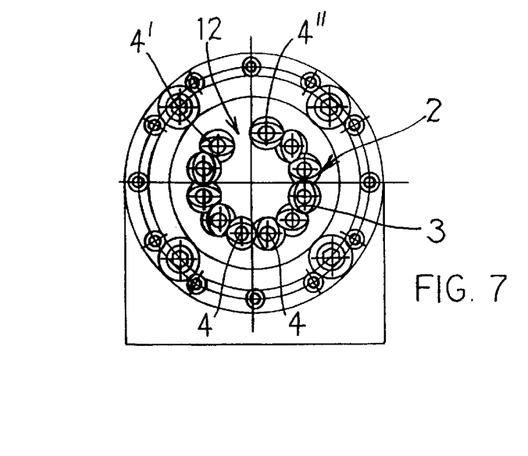
FIGS. 7 and 8 show sections along line VII—VII and VIII—VIII in FIG. 6, respectively.
Figure 8:
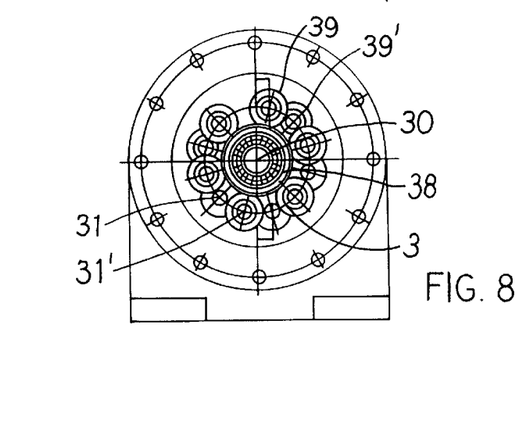

In the embodiment of FIGS. 6 to 8, eleven shafts 4, 4', 4" are provided instead of the nine shafts 4, 4', 4" in the embodiment of FIGS. 1 to 5. However, central angle distance β between shafts 4', 4" at opening 12 is likewise twice as great as central angle distance α between shafts 4, 4', 4" among themselves.

Further, in the embodiment of FIGS. 6 to 8 mixing blocks 13, 13' are provided between screw elements 9 on shafts 4, 4', 4" at an axial distance on two portions, and gas outlet openings 15, 15' on the material discharge side of each mixing block portion 13, 13'.

For driving shafts 4, 4', 4" a gear is provided having driving shaft 30 and one driven shaft 31, 31' for each shaft 4, 4', 4". The eleven driven shafts 31, 31' are each connected via rigid coupling 32 with the eleven shafts 4, 4', 4" carrying processing elements 9, 13, 13'.

Driving shaft 30 and driven shafts 31, 31' are mounted in housing covers 33, 34 and optionally in partition 37 of housing body 35. Housing cover 33 is connected with end plate 7 by tie rods 36.

Driving shaft 30 is coupled positively with driving shafts 31, 31'. For this purpose two driving toothed wheels 38, 38' mutually offset axially (cf. FIG. 9) are disposed on driving shaft 30 so as to rotate therewith on both sides of housing partition 37 to mesh with pinions 39, 39' disposed on an arc around driving shaft 30 on driven shafts 31, 31' so as to rotate therewith, whereby pinions 39, 39' of adjacent driven shafts 31, 31' are for their part offset axially by the same distance as the two driving toothed wheels 38, 38' in order to mesh with one driving toothed wheel 38 or the other driving toothed wheel 38'. A twelfth pinion 39' which idles can of course also be provided along with the eleven driving pinions 39, 39'.

Figure 9:
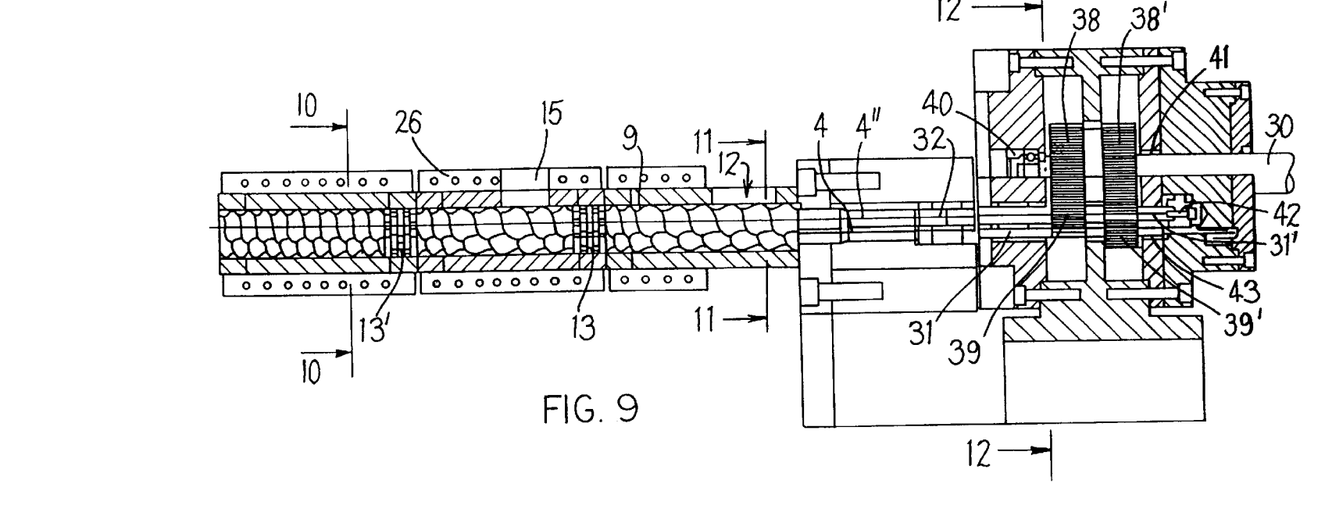
FIG. 9 shows a longitudinal section through a third embodiment of the apparatus with a drive part.
Figure 10:
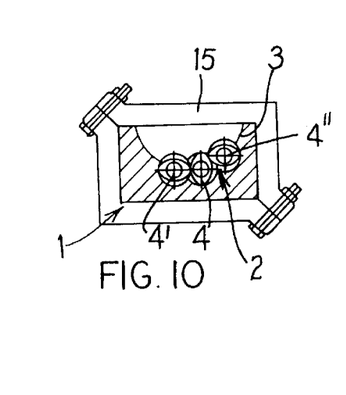
FIGS. 10 to 12 show sections along lines X—X, XI—XI and XII—XII in FIG. 9, respectively.
Figure 11:
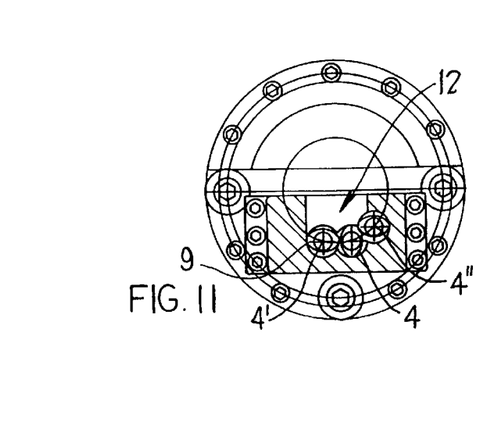
Figure 12:
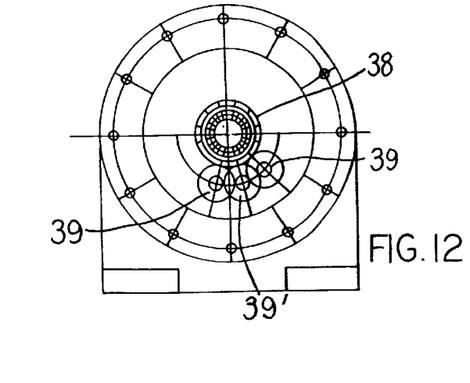

In the embodiment of FIGS. 9 to 12 housing 1 is of rectangular form (FIGS. 10 and 11). For this purpose it can be formed solidly with a longitudinal channel corresponding to space 2, or consist of a base in which a part shaped as a cylindrical segment is disposed, whereby a recess corresponding to space 2 is provided in the base and the cylindrical segment part.

The embodiment of FIGS. 9 to 12 with three shafts 4, 4', 4" actually has a 50% higher volume throughput compared to a twin screw extruder.

FIG. 9 also shows radial-axial bearing 40 and radial bearing 41 with which driving shaft 30 is mounted, as well as axial bearings 42 and radial bearings 43 with which driven shafts 31, 31' are mounted.

Figure 13:
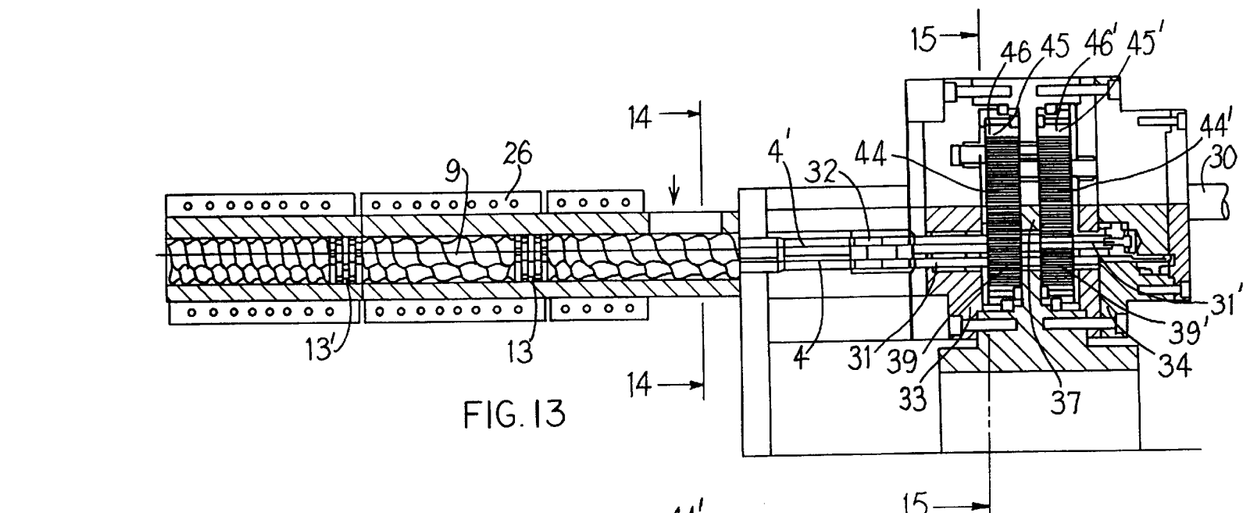
FIG. 13 shows a longitudinal section through a fourth embodiment.
Figure 14:
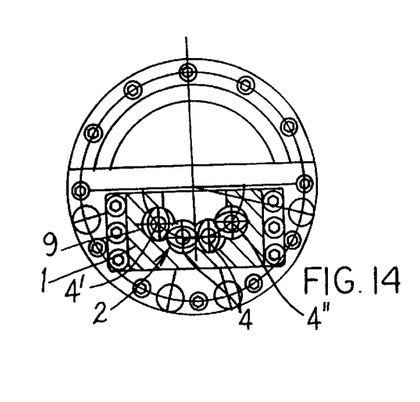
FIGS. 14 and 15 show sections along lines XIV—XIV and XV—XV in FIG. 13, respectively.
Figure 15:
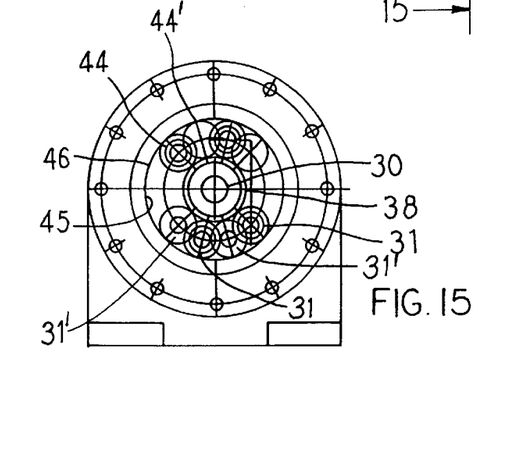

In the embodiment after FIGS. 13 to 15 four shafts 4, 4', 4" with meshing processing elements 9 are provided in housing 1 in circular arc space 2.

Further, driving shaft 30 is coupled with driven shafts 31, 31' not only via driving toothed wheels 38, 38' and pinions 39, 39' but additionally via intermediate pinions 44, 44' which are disposed on an arc around driving shaft 30 and engage in driving toothed wheels 38, 38', on the one hand, and two hollow wheels 46, 46' provided with internal toothing 45, 45', on the other hand.

Hollow wheels 46, 46' and intermediate pinions 44, 44' are axially offset in the same way as driving toothed wheels 38, 38' and pinions 39, 39' on driven shafts 31, 31'. Intermediate pinions 44, 44' are rotatably mounted in housing covers 33, 34 or partition 37.

The number of intermediate pinions 44, 44' and their tooth number corresponds to the tooth number and number of pinions 39, 39' on driven shafts 31, 31'. Intermediate pinions 44, 44' are also disposed at the same central angle distance α as driven shafts 31, 31'. Each pinion 39, 39' has coordinated therewith intermediate pinion 44, 44' disposed diametrically opposite, i.e. offset by a central angle distance of 180°.

The additional coupling of driving shaft 30 via intermediate pinions 44, 44' and hollow wheels 46, 46' provided with internal toothing 45, 45' causes twice the driving power to be passed into shafts 4, 4', 4". The torque is thereby transferred from driving toothed wheels 38, 38' to driven shafts 31, 31' without bending load. Due to the balanced forces there is no high load on the bearings so that relatively small bearings can be installed.

Figure 16:
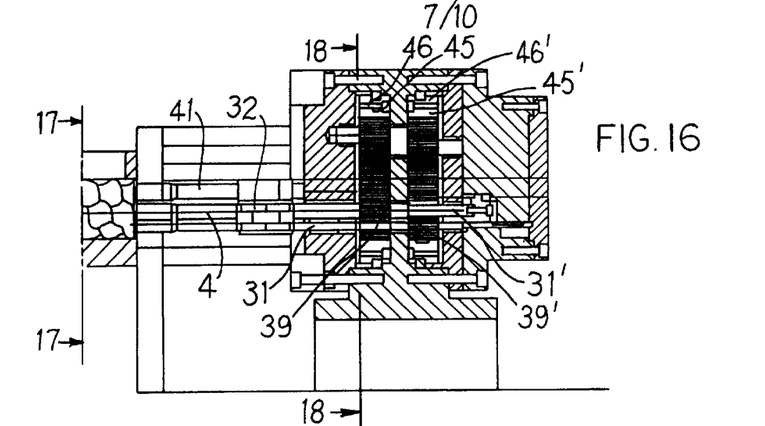
FIG. 16 shows a longitudinal section through the drive part of a fifth embodiment of the apparatus.
Figure 17:
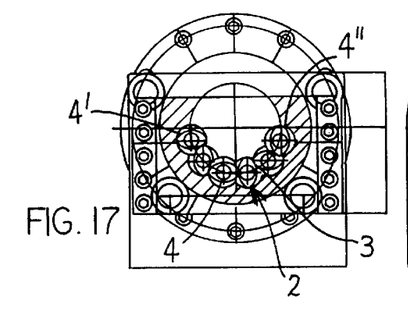
FIGS. 17 and 18 show sections along lines XVII—XVII and XVIII—XVIII in FIG. 16, respectively.
Figure 18:
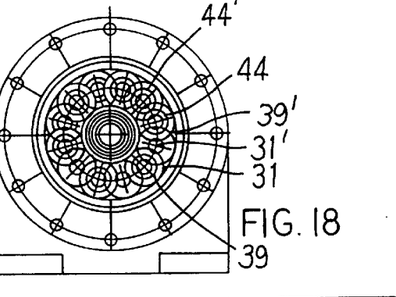

In the embodiment of FIGS. 16 to 18 the six shafts 4, 4', 4" are disposed in housing 1 in space 2 along semicircle 3. The six intermediate pinions 39, 39' of driven shafts 31, 31' have coordinated therewith six pinions 44, 44' likewise disposed along a semicircle, resulting in a closed ring of pinions 39, 39' and intermediate pinions 44, 44' according to FIG. 19. That is to say, pinion 39' and intermediate pinion 44, which are adjacent, have the same central angle distance α as pinions 39, 39' and intermediate pinions 44, 44' with each other.

The embodiment shown in FIGS. 16 to 18, wherein intermediate pinions 44, 44' form a closed ring with pinions 39, 39' on driven shafts 31, 31', achieves maximum driving power and thus maximum volume throughput.

Figure 19:
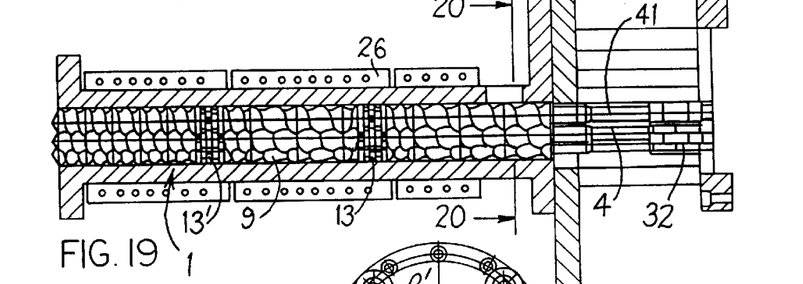
FIG. 19 shows a longitudinal section through a sixth embodiment of the apparatus.
Figure 20:
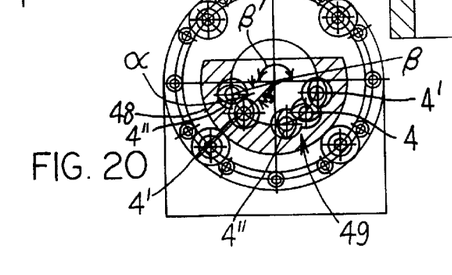
FIG. 20 shows a section along line XX—XX in FIG. 19.
Figure 21:
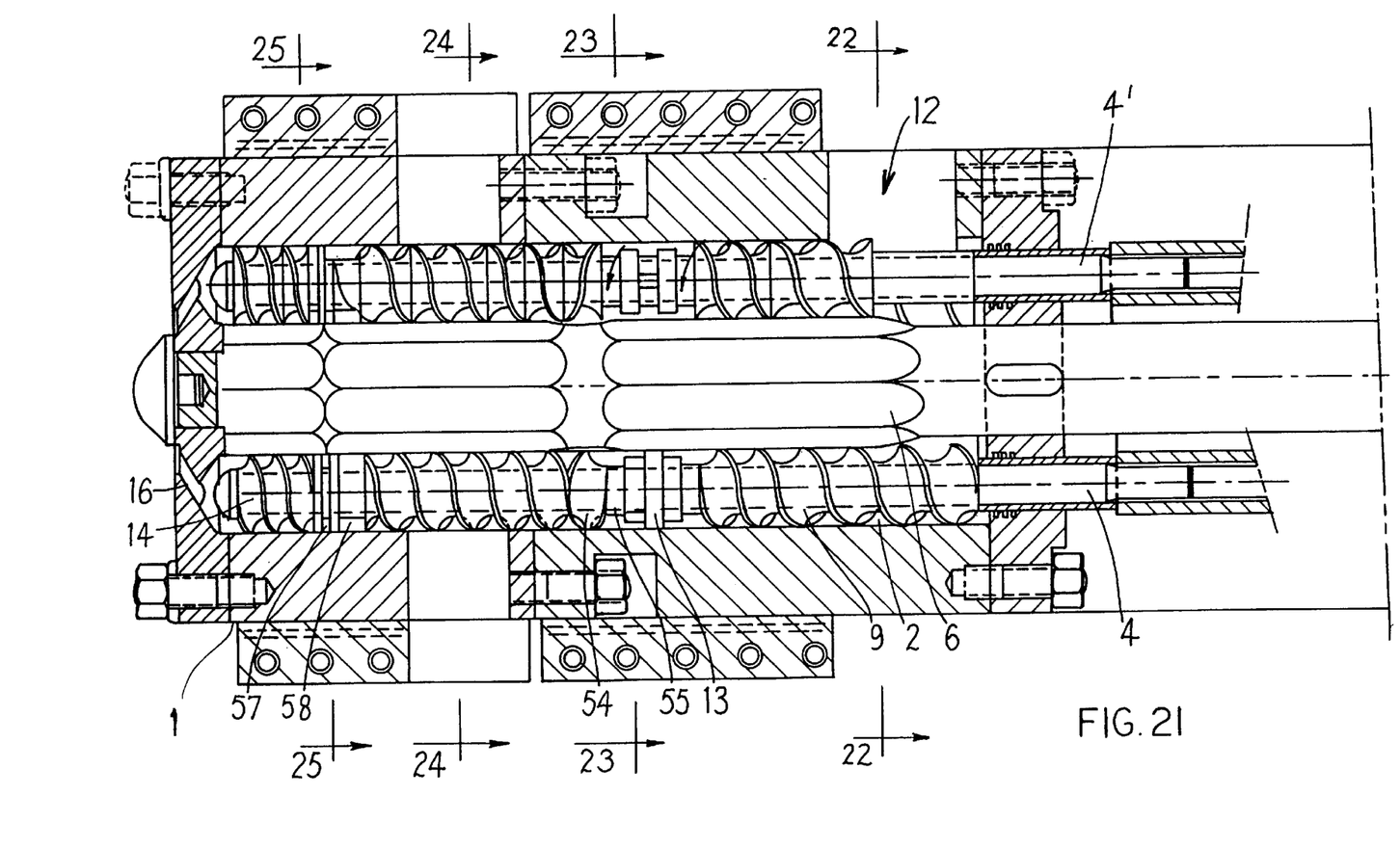
FIG. 21 shows a longitudinal section through a seventh embodiment of the apparatus.

In the embodiment of FIGS. 19 and 20 two groups 48, 49 of shafts 4, 4', 4" are each provided in housing 1 on arc 3 in respective space 2, 2', whereby processing elements 9 of each group 48, 49 mesh. That is to say, central angle distance β, β' between adjacent shafts 4 and 4" of the two groups 48, 49 is greater than central angle distance α between meshing shafts 4, 4', 4".

With the embodiment of FIGS. 19 and 20 one can use the same apparatus to process two different products in parallel. One can therefore use it for example for coextruding two different compositions or for separately mixing two compositions which are then brought together.

The embodiment of FIGS. 21 to 25 differs from the above embodiments in particular in that openings 18 in ring 3 are formed by shafts 4' on which screw element 9 is left out in the area of material supply opening 12 in each case.

Figure 22:
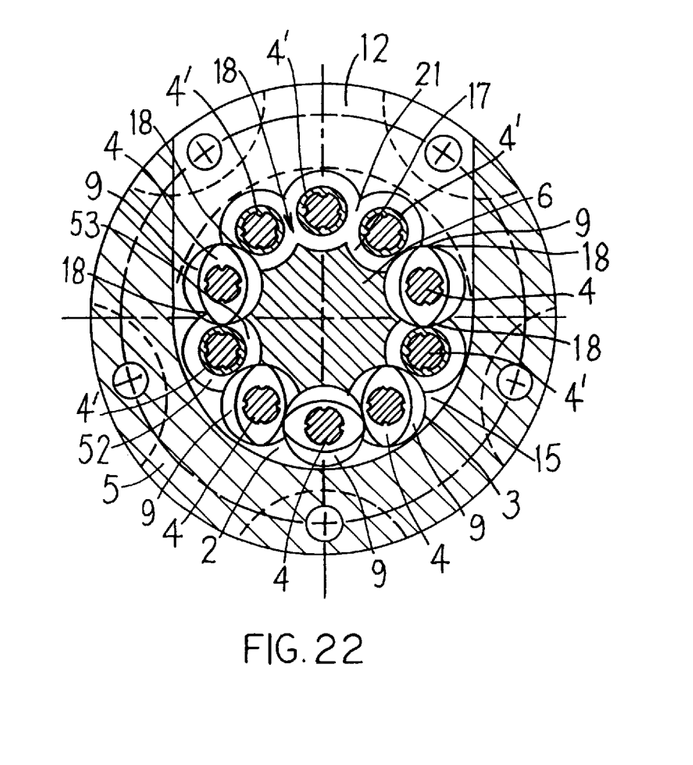
FIGS. 22 to 25 show sections along lines XXII—XXII, XXIII—XXIII, XXIV—XXIV and XXV—XXV in FIG. 21, respectively.
Figure 23:
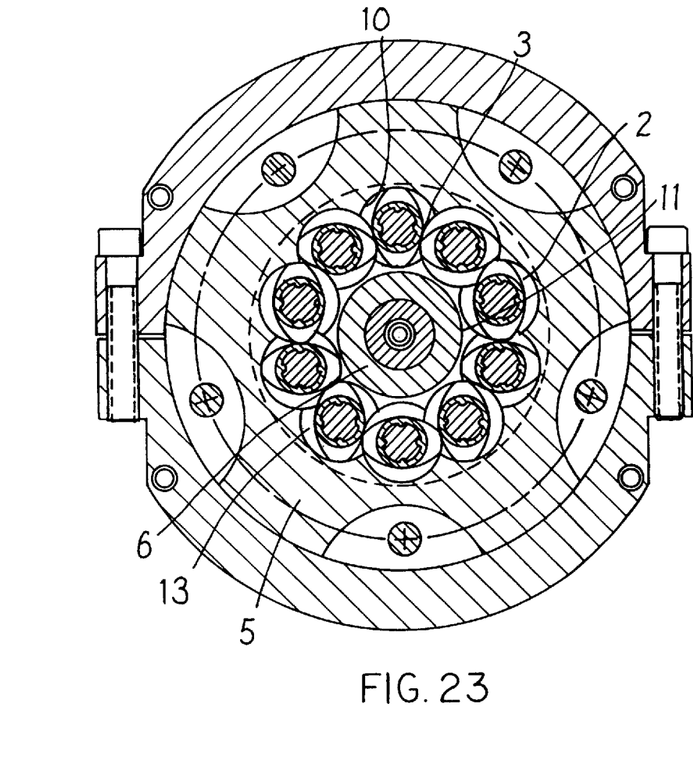
Figure 24:
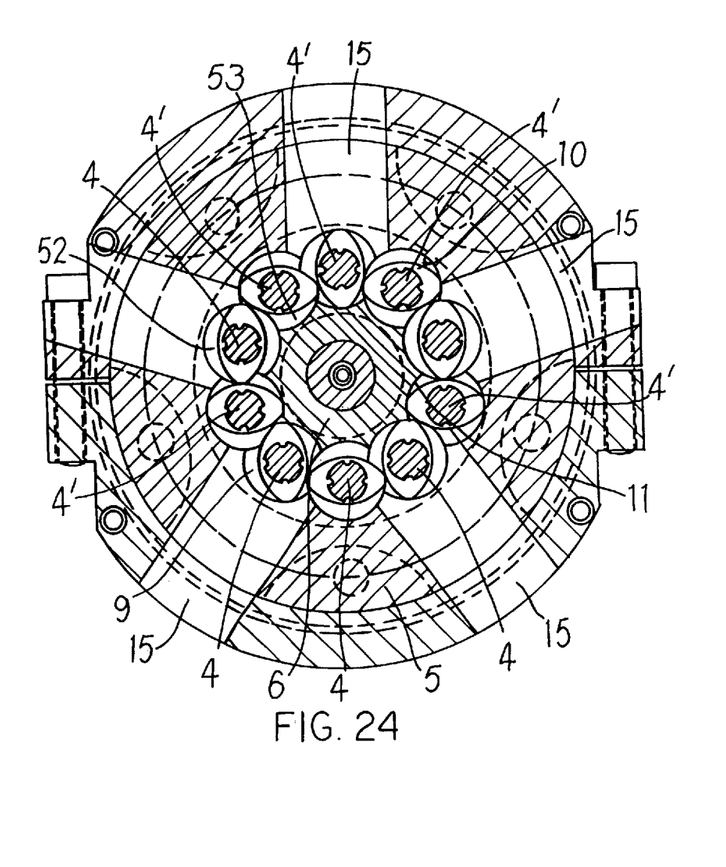
Figure 25:
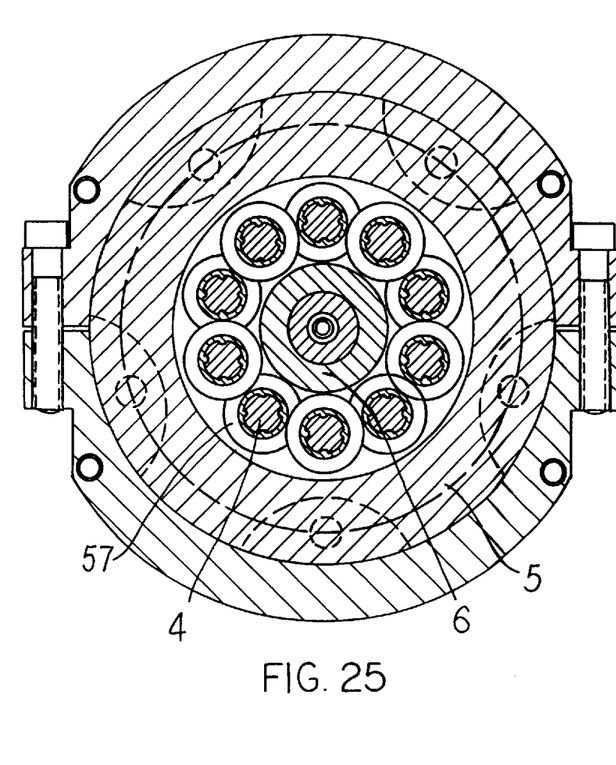

As apparent from FIG. 22, this is the case with the three shafts 4' facing opening 12, and with the two lateral shafts 4' disposed at places where annular space 2 begins to widen into opening 12.

Shafts 4, which are completely equipped with screw elements 9 even in the area of opening 12, are thus the three shafts 4 opposite opening 12, i.e. located below, and the two shafts 4 disposed laterally at the lower end of opening 12.

Due to the absence of screw elements 9 on shafts 4' in the area of material supply opening 12, radial openings 18 arise in the ring or close partial-circle cylinder surface 3 which interconnect radially outer area 52 of annular space 2 and radially inner area 53 (FIG. 22). The material to be processed can thus also pass through openings 18 in ring 3 into inner area 53, causing the quantity of material to be distributed uniformly onto outer and inner areas 52, 53 so that the same pressure prevails in both areas 52, 53. This holds both for solid flowable materials, such as powdery materials, and for liquid materials or granules provided their particle size does not exceed the size of openings 18.

No radial pressure is thus exerted on shafts 4, 4'. They can therefore be given a long design and provided with an accordingly great number of processing elements 9.

Screw elements 9 on shafts 4, 4' extend from material supply opening 12 into closed annular space 2, on the material discharge side to mixing blocks 13. To permit a maximum quantity of material to be pressed through the gaps between mixing blocks 13 of adjacent shafts 4, 4', mixing blocks 13 on shafts 4, 4' are followed on the material discharge side by accumulating processing elements, for example short screw element 54 on each shaft 4, 4' with a pitch opposite screw elements 9. Screw elements 54 feed the material back to mixing blocks 13 so that material is compacted in the area of mixing blocks 13.

Between mixing blocks 13 and accumulating processing elements 54 shafts 4, 4' have a reduced diameter for example due to distance rings 55. This gives rise to additional radial openings in the area of partial-circle cylinder surface 3 which allow mass transfer between areas 52 and 53. Further, concave segments 11 are eliminated by being turned off on inner core 6 in area 55 of shafts 4, 4' with reduced diameter.

The plasticized material is pressed by pressure and the good seal in outer area 52 and the free axial traversing possibilities for the product in inner area 53 of backfeed element 54 according to arrow 56 out of the area between mixing blocks 13 and accumulating processing elements 54 over area 55 of shafts 4, 4' with reduced diameter into radially inner area 53 of annular space 2. Outer area 52 is subsequently loaded only with these layers of material so that great quantities of volatile constituents can be removed free from material discharge through housing openings 15.

For this purpose one or more positive-feed processing elements 9, for example screw elements, are again provided on shafts 4, 4' so as to mesh with adjacent shafts 4, 4' with little play. In the degassing portion with gas outlet openings 15 inner core 6 and the inside of peripheral housing wall 5 are likewise provided with axis-parallel, concave segments 11, 10, respectively, in which screw element or elements 9 of the particular shaft 4, 4' engage with little play.

The gases emerging from the plasticized material in the degassing portion flow through the thin gaps between screws 9 of adjacent shafts 4, 4' into outer area 52 of annular space 2 to gas outlet openings 15.

To accelerate degassing, a vacuum can be applied to openings 15. Openings 15 can be disposed in a star shape around the periphery of inside housing wall 5.

The material is discharged via channels 16. For compacting the plasticized material before it enters channels 16, accumulating processing elements, e.g. in the form of baffle plates 57, are provided on shafts 4, 4' on the material discharge side of the degassing portion. Baffle plates 57 of adjacent shafts 4, 4' mesh so as to form a labyrinth. Between baffle plates 57 and screw elements 9 short axial areas with reduced diameter are provided on shafts 4, 4', e.g. through distance rings 58. Further, concave segments 11 are eliminated on inner core 6 in the area of baffle plates 57. In addition, inner core 6 and inside housing wall 5 are turned off somewhat in the area of baffle plates 57 so that the plasticized material compacted in area 59 accordingly passes uniformly distributed via baffle plates 57 into outer area 52 and inner area 53 of annular space 2 on the material discharge side of baffle plates 57, where shafts 4, 4' are provided in their end area with positive-feed processing elements, i.e. screw elements 9.

I claim:

1. An apparatus for continuous processing of pourable and flowable materials, comprising: a housing having a central axis and radially inner and outer sides defining a space therebetween; a plurality of elongate axis-parallel, rotatable shafts disposed at the same radial distance from the central axis along a circle in the space, the rotatable shafts being spaced at equal angles from an adjacent one of the shafts relative to the central axis, each of the plurality of shafts carrying a plurality of processing elements disposed axially one behind the other with which processing elements on adjacent shafts closely mesh, the housing having axis-parallel concave segments on the radially inner and outer sides, the concave segments receiving and guiding the shafts and processing elements; at least one material supply opening positioned at one end of the housing extending into the space; at least one material discharge opening at the other end of the housing extending from the space; and at least one radial opening positioned along the circle for passage of material from the radially outer side to the radially inner side of the space.

2. The apparatus of claim 1, wherein at least one compacting zone is provided in the space, and at least one shaft is free of processing elements between the material supply opening and the compacting zone.

3. The apparatus of claim 2, wherein mixing blocks define the compacting zone.

4. The apparatus of claim 1, wherein the at least one radial opening is defined by a processing element-free shaft positioned on the circle, and an angle formed between the processing element-free shaft and adjacent shafts is equal to the angle between adjacent shafts having processing elements.

5. The apparatus of claim 1, wherein the housing at the radially inner side of the space defines a core, the concave segments extend into the core receiving the shafts therein, and in a partial axial area of the material supply opening the core is free of concave segments.

6. The apparatus of claim 1, wherein the housing at the radially inner side of the space defines a core, the material supply opening is free of the core at least over an axial area.

7. The apparatus of claim 1, wherein the processing elements are screw elements.

8. The apparatus of claim 1, wherein a degassing portion is provided having degassing openings extending into the space.

9. The apparatus of claim 8, wherein at least one compacting zone is provided in the space, the compacting zone having a material discharge side, one of the shafts is free of processing elements from the material supply opening to the compacting zone, and the degassing portion is disposed on the material discharge side of the compacting zone.

10. The apparatus of claim 9, wherein the degassing portion passes material from outside to inside the circle, and the degassing portion has degassing openings extending into the space through the outer side of the housing.

11. The apparatus of claim 10, wherein the degassing portion extends through both of the concave segments on the housing outer side and the housing inner side.

12. The apparatus of claim 9, wherein the housing has a core radially inward of the inner side of the housing, and the degassing portion passes material from inside to outside the circle and has degassing openings extending into the space through the core.

13. The apparatus of claim 1, wherein end walls of the housing enclose the space at longitudinal ends of the housing, and channels form the material discharge openings, the channels extend from the space through one of the end walls of the housing.

14. The apparatus of claim 1, wherein a gear system is provided having a driving shaft and driven shafts connected to the shafts having the processing elements, the driving shaft and driven shafts rotating to drive the shafts, the driving shaft and the driven shafts being coupled positively with each other by toothed wheels disposed thereon so as to rotate with each other.

15. An apparatus for continuous processing of flowable material, comprising: a elongate housing having a central axis and radial inner and outer sides defining an elongate space therebetween; a plurality of axis-parallel, rotatable shafts disposed at the same radial distance from the central axis, the plurality of shafts having first and second groups, the first group having first and second shafts each having a plurality of processing elements which closely mesh with a single adjacent shaft of the plurality of shafts, the second group having a plurality of processing elements which closely mesh with two adjacent shafts of the plurality of shafts, the processing elements of the first and second shafts meshing with the processing elements of the respective second group shafts, the second group shafts being positioned on the circle at equal first angles measured from the adjacent shaft, the first angles having vertices at the central axis, the first shaft being positioned at the first angle from the adjacent shaft of the second group, the second shaft being positioned at the first angle from the adjacent shaft of the second group; at least one radial opening positioned between the first and second shafts, the radial opening defining a second angle between the first and second shafts, the second angle being greater than the first angle between the shafts in the second group; the space having an arcuate cross section including concave segments receiving processing elements of the first and second shafts therein.

16. An apparatus for continuous processing of flowable material, comprising: a elongate housing having a central axis and radial inner and outer sides defining an elongate space; at least five axis-parallel, rotatable shafts sequentially disposed at the same radial distance from the central axis along a circle in the space, the shafts each having a plurality of processing elements thereon, first and second of the five shafts being adjacent and being spaced apart at a first angle, the second and a third of the five shafts being adjacent and spaced apart at a second angle, the third and a fourth of the five shafts being adjacent and being spaced apart at the first angle, the fourth and a fifth of the five shafts being adjacent and being spaced apart at the first angle, the first and fifth shafts being adjacent and spaced apart at a third angle, the second angle being greater than the first angle, the third angle being greater than the first and second angles, the processing elements of the first and second shaft closely meshing to process material, the processing elements of the third and fourth closely meshing to process material, the processing elements of the fourth and fifth shafts closely meshing to process material.

17. An apparatus for continuous processing of pourable and flowable material, comprising: an elongate housing having a central axis, radially inner and outer sides defining a space, and end walls respectively enclosing the space at the longitudinal ends of the housing; a plurality of axis-parallel, rotatable shafts disposed at the same radial distance from the central axis along a circle in the space, the rotatable shafts being at equal angles from an adjacent one of the shafts relative to the central axis, each of the plurality of shafts having a plurality of processing elements disposed axially one behind the other with which adjacent shafts mesh, the housing having pairs of axis-parallel concave segments on the inner and outer sides of the housing, each pair of concave segments receiving and guiding one of the shafts and the processing elements on the one shaft; at least one material supply opening positioned at one end of the housing, the material supply opening extending into the space; at least one material discharge opening positioned at the other end of the housing, the material discharge opening extending from the space; at least one radial opening positioned along the circle for passage of material from outside to inside the circle; and a gear system having a driving shaft, driven shafts, and toothed wheels positively connecting the driving shaft to the driven shafts, the driven shafts being connected to the rotatable shafts having the processing elements thereon for driving the rotatable shafts to process material, and at least one intermediate pinion and at least one hollow wheel having internal toothing coupling the toothed wheels between the driving shaft and the driven shaft.

18. The apparatus of claim 17, wherein the driven shafts and the intermediate pinions are disposed at the same angle as the shafts.

19. An apparatus for continuous processing of pourable and flowable material, comprising: an elongate housing having a central axis, radially inner and outer sides defining a space, and end walls respectively enclosing the space at the longitudinal ends of the housing; a plurality of axis-parallel, rotatable shafts disposed at the same radial distance from the central axis along a circle in the space, the rotatable shafts being at equal angles from an adjacent one of the shafts relative to the central axis, each of the plurality of shafts having a plurality of processing elements disposed axially one behind the other with which adjacent shafts mesh, the housing having pairs of axis-parallel concave segments on the radially inner and outer sides thereof, each pair of concave segments receiving and guiding one of the shafts and the processing elements on the one shaft; at least one material supply opening positioned at one end of the housing extending into the space; at least one material discharge opening positioned at the other end of the housing extending from the space; at least one radial opening positioned along the circle for passage of material from outside to inside the circle; a gear system having a driving shaft, driven shafts and toothed wheels positively connecting the driving shaft to the driven shafts, the driven shafts being connected to the rotatable shafts having the processing elements thereon for driving the rotatable shafts to process material, and two of the toothed wheels being offset axially on the driving shaft and rotating therewith, and the toothed wheels being formed on the driven shafts by pinions disposed thereon so as to rotate therewith, the pinions of adjacent driven shafts being mutually offset axially for engagement in one of the two toothed wheels connected to the driving shaft.

20. The apparatus of claim 19, wherein at least one intermediate pinion and one hollow wheel each have internal toothing coupling the two toothed wheels and the pinions.

21. The apparatus of claim 20, wherein the number of intermediate pinions corresponds to the number of pinions on the driven shafts.

22. The apparatus of claim 21, wherein an intermediate pinion is disposed diametrically opposite each pinion on one of the driven shafts.

23. The apparatus of claim 20, wherein the adjacent pinions and intermediate pinions are disposed at the same angle as the adjacent pinions and the adjacent intermediate pinions between each other.

24. The apparatus of claim 20, wherein the driven shafts and the intermediate pinions are disposed at the same angle as the shafts.

* * * * *